United States Patent
Shin (10) Patent No.: US 8,349,512 B2
(45) Date of Patent: Jan. 8, 2013

(54) MULTI-MEA TEST STATION AND MULTI-MEA TEST METHOD USING THE SAME

(75) Inventor: Chan Gyun Shin, Suwon-si (KR)

(73) Assignee: Samsung SDI Co., Ltd., Yongin, Gyeonggi-do (KR)

( * ) Notice: Subject to any disclaimer, the term of this patent is extended or adjusted under 35 U.S.C. 154(b) by 1183 days.

(21) Appl. No.: 12/014,350

(22) Filed: Jan. 15, 2008

(65) Prior Publication Data
US 2008/0197857 A1 Aug. 21, 2008

(30) Foreign Application Priority Data
Feb. 15, 2007 (KR) .................... 10-2007-0016195

(51) Int. Cl.
H01M 8/10 (2006.01)
H01M 8/04 (2006.01)
G01R 27/00 (2006.01)

(52) U.S. Cl. ......... 429/483; 429/511; 429/514; 324/555

(58) Field of Classification Search .......... 429/400–535; 204/400–435; 324/555
See application file for complete search history.

(56) References Cited

U.S. PATENT DOCUMENTS

| | | | |
|---|---|---|---|
| 6,030,718 A * | 2/2000 | Fuglevand et al. ............ | 429/410 |
| 2005/0048346 A1* | 3/2005 | Fannon et al. ................ | 429/34 |
| 2006/0105214 A1* | 5/2006 | Anderson ..................... | 429/30 |
| 2006/0269820 A1* | 11/2006 | Shen et al. .................... | 429/38 |

FOREIGN PATENT DOCUMENTS

| | | |
|---|---|---|
| JP | 09-283168 A | 10/1997 |
| JP | 2003-151603 A | 5/2003 |
| JP | 2003-203667 A | 7/2003 |
| JP | 2004-220786 | 8/2004 |
| JP | 2005-071882 | 3/2005 |
| JP | 2005-142062 A | 6/2005 |
| JP | 2006-155935 | 3/2006 |
| KR | 1020030064463 A | 8/2003 |

OTHER PUBLICATIONS

Machine Translation of JP 2006-155935 originally published Jun. 2006 to Ishibashi et al.*
Machine Translation of JP H09-283168 originally published Oct. 1997 to Murayama et al.*

* cited by examiner

*Primary Examiner* — Basia Ridley
*Assistant Examiner* — Jonathan G Leong
(74) *Attorney, Agent, or Firm* — Knobbe, Martens, Olson & Bear, LLP (57) ABSTRACT

Disclosed is a multi-MEA test station capable of simultaneously testing and activating a plurality of MEAs and a multi-MEA test method using the same. The multi-MEA test station includes a chamber capable of receiving a plurality of MEAs; a first multi cell body including a first channel for supplying an oxidant to a cathode electrode of the MEA, and a second multi cell body including a second channel for supplying fuel to an anode electrode of the MEA; a pressing means closely adhering the first multi cell body, the second multi cell body and the MEA positioned therebetween by applying force in a direction that the first multi cell body and the second multi cell body are opposed to each other; a reactant supply means for supplying the oxidant to the first channel and supplying the fuel to the second channel; and a multi-loader controlling the environment of a test and activation on the plurality of MEAs and performing the test and the activation.

13 Claims, 5 Drawing Sheets

MULTI-MEA TEST STATION AND MULTI-MEA TEST METHOD USING THE SAME

CROSS-REFERENCE TO RELATED APPLICATION

This application claims the benefit of Korean Patent Application No. 10-2007-0016195, filed on Feb. 15, 2007, in the Korean Intellectual Property Office, the disclosure of which is incorporated herein by reference.

BACKGROUND

1. Technical Field

The present disclosure relates to a performance test and an activation technique of an MEA (membrane electrode assembly) for a fuel cell, and more particularly to a multi-MEA test station having a new structure suitable for mass production of a fuel cell stack and a multi-MEA test method using the same.

2. Description of the Related Art

A fuel cell, which is a power generation system that directly converts fuel energy to electrical energy, has the advantages of low pollution and high efficiency. In particular, since fuel cells can generate electrical energy from an easily store and transported energy source, such as gasoline, natural gas, methanol, and the like, fuel cells been spotlighted as next generation energy sources. According to the type of electrolyte used, fuel cells can be classified as phosphoric acid fuel cells, molten carbonate fuel cells, solid oxide fuel cells, polymer electrolyte fuel cells, and alkaline fuel cells, and the like. These different types of fuel cells operate on the same basic principle, but differ in view of types of fuels used, operating temperatures, catalysts, electrolytes, and the like.

A polymer electrolyte membrane fuel cell uses a proton-conducting polymer membrane as an electrolyte and, as a single cell, comprises a polymer electrolyte membrane and a membrane electrode assembly (MEA) comprising an anode electrode and a cathode electrode positioned on each side of the polymer electrolyte membrane. Generally, the polymer electrolyte membrane fuel cell is manufactured in a stack structure comprising a plurality of alternately stacked single cells and bipolar plates (BP), which comprise a channel for supplying a fuel and an oxidant to the single cells. One type of fuel cell using a proton conductive polymer membrane electrolyte is a direct methanol fuel cell, which directly supplies liquid-phase fuel to an anode, in addition to the polymer electrolyte membrane fuel cell as described above. Since the direct methanol fuel cell does not use a fuel processor and operates at the operating temperature less than 100° C., it is advantageous used for portable or small-sized fuel cell structures.

Meanwhile, in order to manufacture the fuel cell stack, the performance of the membrane electrode assembly should be tested prior to the completion of the stack. Otherwise, a bad specific membrane electrode assembly will degrade the performance of the entire stack, and in such a case, it takes considerable processes and costs for dismantling the fuel cell stack and replacing the bad membrane electrode assembly.

A single fuel cell stack may include several to several tens of membrane electrode assemblies. Therefore, in order to manufacture one fuel cell stack, the performances of each of several to several tens membrane electrode assemblies should be tested, if possible.

The device and the method for testing a conventional membrane electrode assembly have been disclosed in Japanese Laid-Open Patent Publication No. 2004-220786 (Aug. 5, 2004) and Japanese Laid-Open Patent Publication No. 2005-71882 (Mar. 17, 2005), and the like. The MEA test methods disclosed in the publications are basically the methods to test a single membrane electrode assembly. Therefore, the conventional MEA test methods described above take too much time to test all of the membrane electrode assemblies.

On the other hand, the membrane electrode assemblies may each be tested by using several tens test devices, with concomitant increased costs of equipment for the test device and for maintaining and managing the test device.

Also, after the test of the membrane electrode assembly, the performance of the membrane electrode assembly may be improved by activation. In this case, it takes at least one test device a predetermined time, for example, operating time for several hours or several ten hours, in order to test one membrane electrode assembly and to perform the activation. Such an environment is not suitable for a process for mass production of the fuel cell stack.

SUMMARY OF THE INVENTION

It is an object to provide a multi-MEA test station having a new structure suitable for mass production of a fuel cell stack.

It is another object to provide a multi-MEA test method using the multi-MEA test station having the new structure.

In order to accomplish the objects, there is provided a multi-MEA test station according to one aspect including: a chamber capable of receiving a plurality of MEAs; a first multi cell body including a first channel for supplying an oxidant to a cathode electrode of the MEA, and a second multi cell body including a second channel for supplying fuel to an anode electrode of the MEA; a pressing means pressing together the first multi cell body, the second multi cell body, and the MEA positioned therebetween by applying force in a direction that the first multi cell body and the second multi cell body are opposed to each other; a reactant supply means for supplying the oxidant to the first channel and supplying the fuel to the second channel; and a multi-loader controlling the environment of a test and activation on the plurality of MEAs and performing the test and the activation.

Preferably, the first multi cell body includes a plurality of first concave portions electrically separated to correspond to each of the MEA, and the second multi cell body includes a plurality of second concave portions electrically separated to correspond to each of the MEA and corresponding to the plurality of first concave portions.

The first multi cell body and the second multi cell body are detachably attached on the distal part of the pressing means.

The pressing means includes a hydraulic pressing device.

The reactant supply means includes a fuel pump for supplying the fuel and an air pump for supplying the oxidant.

The reactant supply means includes a fluid flow controller for controlling the flow of the fuel supplied from the fuel pump to each of the MEA.

The multi-loader includes a power source unit for applying a DC signal or an AC signal to the MEA, and a sensor for sensing any one of the voltage, current, impedance, and electrostatic capacity of the MEA, and the combination thereof.

The chamber is a chamber of constant temperature and constant humidity.

The chamber includes a temperature sensor installed adjacent to the MEA.

The multi-MEA test station further includes a purging means supplying fluid for purging to the first channel or the second channel.

The multi-MEA test station includes a first station and a second station for alternately performing the process of test and activation for the plurality of MEAs and the process of loading and unloading for the plurality of MEAs.

The fuel includes liquid-phase fuel or gas-phase fuel containing hydrogen.

There is provided a multi-MEA test method according to another aspect including the steps of: putting a plurality of MEAs on a first multi cell body in a chamber of constant temperature and constant humidity; pressing the first multi cell body and a second multi cell body corresponding to the first multi cell body, with the MEA therebetween; supplying an oxidant to a cathode electrode of the MEA though a first channel provided in the first multi cell body and supplying fuel to an anode electrode of the MEA through a second channel provided in the second multi cell body; and performing a test on the plurality of MEAs by using a multi-loader.

Preferably, the step of pressing the first and the second multi cell bodies includes a pressing step using a hydraulic press.

The step of performing a test on the plurality of MEAs includes steps of sensing the parameter of any one of the voltage, current, impedance, and electrostatic capacity of each of the MEA, and the combination thereof, and testing the performance of each of the MEA by using the sensed parameter.

The multi-MEA test method further includes a step of performing activation on the plurality of MEAs. The step of performing activation includes a step of operating the plurality of MEAs for a desired time.

The multi-MEA test method further includes a step of supplying fluid for purging to the first channel or the second channel.

Some embodiments provide a multi-MEA test station comprising: a chamber configured for receiving a plurality of MEAs; a first multi cell body comprising a first channel configured for supplying an oxidant to a cathode electrode of an MEA, and a second multi cell body comprising a second channel configured for supplying fuel to an anode electrode of an MEA; a pressing device configured for closely contacting the first multi cell body, the second multi cell body and an MEA interposed therebetween by applying opposed compressive force between the first multi cell body and the second multi cell body; a reactant supply configured for supplying an oxidant to the first channel and supplying a fuel to the second channel; and a multi-loader configured for controlling the environment of the chamber during testing and activation of the plurality of MEAs, and configured for performing the testing and the activation.

In some embodiments, the first multi cell body comprises a plurality of concave portions electrically separated, each concave portion corresponding to an MEA, and the second multi cell body comprises a plurality of concave portions electrically separated, each concave portion corresponding to an MEA, and corresponding to a concave portion of the first multi cell body.

In some embodiments, the first multi cell body and the second multi cell body are each detachably mounted on distal portions of the pressing assembly. In some embodiments, the pressing assembly comprises a hydraulic pressing device.

In some embodiments, the reactant supply comprises a fuel pump configured for supplying fuel and an air pump configured for supplying oxidant. In some embodiments, the reactant supply comprises a fluid flow controller configured for controlling the flow of fuel supplied from the fuel pump to each of the MEA.

In some embodiments, the multi-loader comprises a power source unit configured for applying a DC signal or an AC signal to the MEA, and a sensor for sensing at least one of voltage, current, impedance, and electrostatic capacity of the MEA.

In some embodiments, the chamber has a substantially constant temperature and substantially constant humidity. In some embodiments, the chamber comprises a temperature sensor installed adjacent to an MEA.

Some embodiments further comprise a purging device configured for supplying fluid for purging at least one of the first channel and the second channel.

Some embodiments comprise a first station and a second station configured for alternately performing testing and activation of a plurality of MEAs, and configured for loading and unloading the plurality of MEAs.

In some embodiments, the fuel comprises a liquid-phase fuel or gas-phase fuel containing hydrogen.

Some embodiments provide a multi-MEA test method comprising: disposing a plurality of MEAs on a first multi cell body in a chamber of substantially constant temperature and substantially constant humidity; compressing the plurality of MEAs between the first multi cell body and a second multi cell body corresponding to the first multi cell body; supplying an oxidant to a cathode electrode of each MEA though a first channel provided in the first multi cell body and supplying fuel to an anode electrode of each MEA through a second channel provided in the second multi cell body; and performing a test on the plurality of MEAs using a multi-loader.

In some embodiments, compressing the first and the second multi cell bodies comprises compressing with a hydraulic press.

In some embodiments, performing a test on the plurality of MEAs includes sensing at least one of the voltage, current, impedance, and electrostatic capacity of each MEA, and assessing the performance of each MEA from the sensed parameter.

Some embodiments further comprise activating the plurality of MEAs. In some embodiments, activating comprises operating the plurality of MEAs for a predetermined time.

Some embodiments further comprise fluidly purging at least one of the first channel and the second channel.

In some embodiments, the fuel comprises a liquid-phase fuel or a gas-phase fuel containing hydrogen.

DETAILED DESCRIPTION OF EXEMPLARY EMBODIMENTS

In the following detailed description, certain exemplary embodiments are shown and described, by way of illustration. As those skilled in the art would recognize, the described exemplary embodiments may be modified in various ways, all without departing from the spirit or scope of the present disclosure. Accordingly, the drawings and description are to be regarded as illustrative in nature, rather than restrictive.

In the explanation to be described hereinafter, the fuel supplied to an anode of a MEA includes liquid-phase fuel containing hydrogen or gas-phase fuel containing hydrogen. The liquid-phase fuel is used for testing and/or activating the MEA in manufacturing a direct methanol fuel cell stack. The gas-phase fuel is used for testing and/or activating the MEA in manufacturing a polymer electrolyte membrane fuel cell stack. As the liquid-phase fuel, a methanol aqueous solution, and the like can be used, and as the gas-phase fuel, hydrogen gas, and the like can be used.

Figure 1:
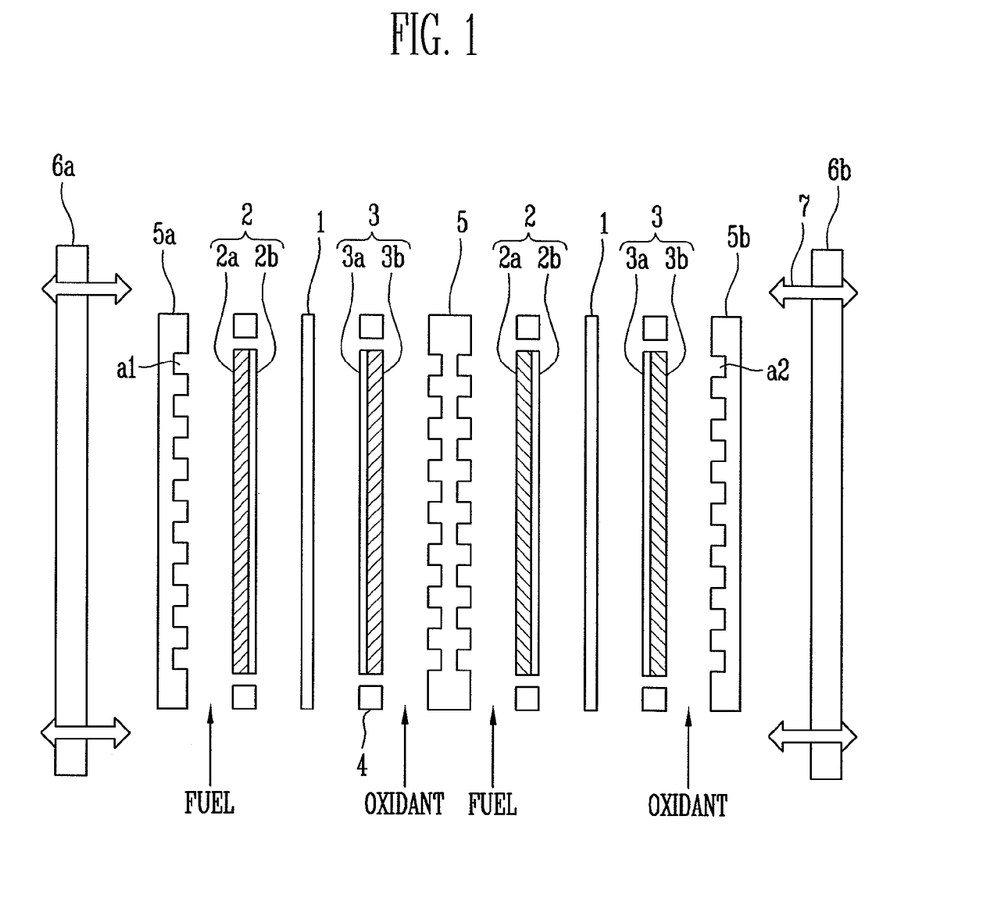
FIG. 1 is a schematic cross section of an embodiment of a manufacturing process of a general fuel cell stack using a polymer membrane as an electrolyte.

FIG. 1 schematically illustrates in cross section a manufacturing process for a fuel cell stack using a polymer membrane as an electrolyte.

As shown in FIG. 1, a membrane electrode assembly (MEA) should first be prepared by bonding an anode electrode 2 and a cathode electrode 3 to both sides of a polymer electrolyte membrane 1. The anode electrode 2 and the cathode electrode 3 generally comprise metal catalyst layers 2$a$;3$a$ and diffusion layers 2$b$;3$b$, respectively. Next, after a plurality of the prepared membrane electrode assemblies, a gasket 4, and bipolar plates 5, 5$a$, and 5$b$ are alternately stacked, end plates 6$a$ and 6$b$ are disposed on the both ends of the stack structure. The bipolar plates 5, 5$a$, and 5$b$ are equipped with channels a1 and a2 configured for fuel and oxidant flow. And, the end plates 6$a$ and 6$b$ are fastened together by means of a fastening means 7 under a predetermined pressure, thereby completing the manufacturing of the fuel cell stack. In some embodiments, it may take a predetermined time to manufacture the fuel cell stack, for example, about thirty minutes.

Figure 2:
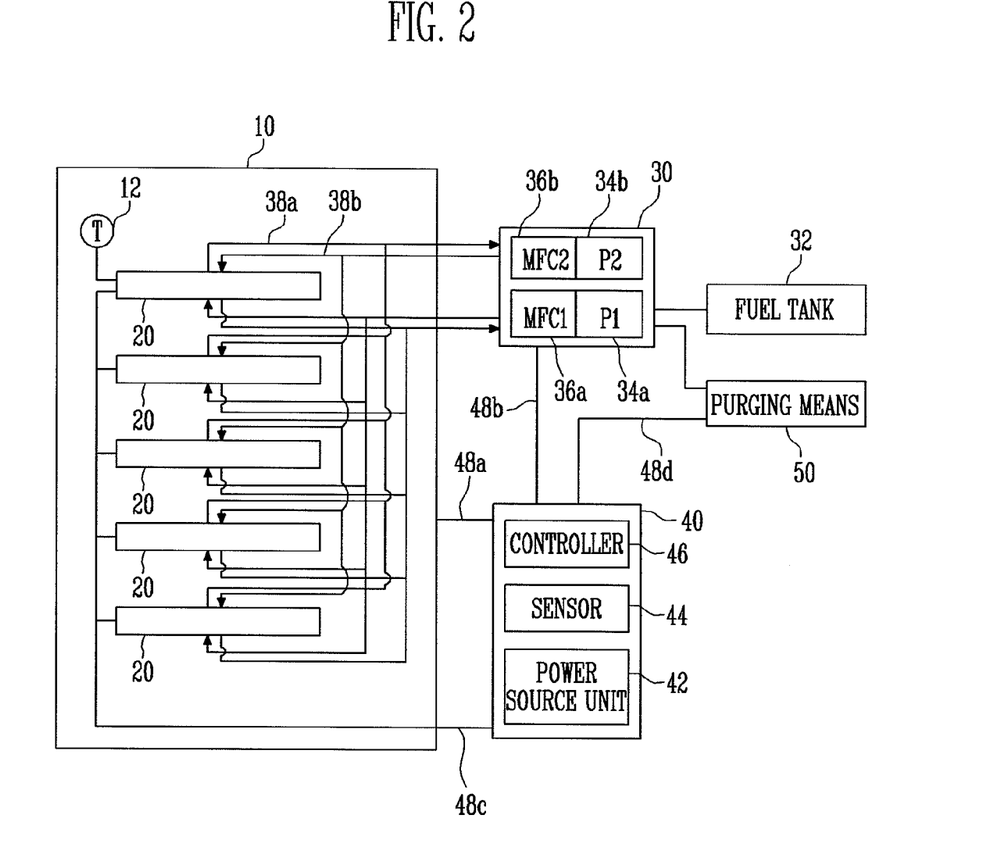
FIG. 2 is a schematic view of an embodiment of a multi-MEA test station.

FIG. 2 is a schematic view of an embodiment of a multi-MEA test station.

Referring to FIG. 2, in order to test and activate a plurality of MEAs with a single device, the multi-MEA station includes a chamber 10, an auto pressing means 20, a reactant supply means 30, a multi-loader 40, and a purging means 50.

The chamber 10 includes an inner space configured for receiving a plurality of MEAs. In the illustrated embodiment, the chamber 10 is capable of arranging five layers of five MEAs. As the chamber, a chamber of constant temperature and/or constant humidity can be used in order to provide a correct test environment. Furthermore, the chamber 10 preferably includes a temperature sensor 12 installed at a position where the temperature of the MEA can be reliably detected when the plurality of MEAs operate. The position where the temperature of the MEA can be reliably detected includes a position directly contacting the MEA or a position contacting the auto pressing means 20 surrounding the MEA.

The auto pressing means 20 supplies fuel and an oxidant to the anode electrode and cathode electrode of each MEA, reproducing conditions under which the MEAs are arranged in stacks. In the present embodiment, the auto pressing means comprises five auto pressing means 20, wherein each of the auto pressing means 20 is configured to independently perform a test and activation on five MEAs.

The reactant supply means 30 includes a device for supplying a fuel and an oxidant for operating a fuel cell to the plurality of MEAs mounted in the auto pressing means 20. The reactant supply means 30 includes a fuel tank 32 storing fuel, a fuel pump (P1) 34$a$ for supplying fuel, a first mass flow controller (MFC1) 36$a$ distributing and supplying the fuel supplied from the fuel pump 34$a$ to the plurality of MEAs, and a first conduit 38$a$ fluidly coupling the fuel output from the first mass flow controller 36$a$ to the auto pressing means 20. Also, the reactant supply means 30 includes an air pump (P2) 34$b$ for supplying air as an oxidant, a second mass flow controller (MFC2) 36$b$ distributing and supplying the air supplied from the air pump 34$b$ to the plurality of MEAs, and a second conduit 38$b$ fluidly coupling the air output from the second mass flow controller 36$b$ to the auto pressing means 20.

The first mass flow controller 36$a$ is coupled to at least one fuel pump 34$a$, and the second mass flow controller 36$b$ is coupled to at least one air pump 34$b$. Also, the first and the second mass flow controllers 36$a$ and 36$b$ are configured to simultaneously and/or sequentially supply fuel or air to the five layers of the MEAs, and/or to simultaneously and/or sequentially supply fuel or air to the five MEAs of each layer.

The multi-loader 40 controls the test and activation environment of the plurality of MEAs received in the chamber 10, and performs the test and the activation of the plurality of MEAs. The multi-loader 40, which is coupled to the chamber 10, controls the temperature and humidity of the chamber 10, measures a desired characteristic parameter, for example, at least one of voltage, current, impedance, phase angle, and electrostatic capacity, of each of MEA received in the chamber 10, and tests the performance of each MEA based on the characteristic measured parameter of the MEA.

The multi-loader 40 includes a power source unit 42 for supplying power and/or applying a DC signal and an AC signal to the MEA received in the chamber 10, a sensor 44 for sensing at least one of the voltage, current, impedance, and electrostatic capacity of an MEA received in the chamber 10, and a controller 46 for controlling the environment of a test and activation of the plurality of MEAs, for example, the temperature and humidity of the chamber 10, and the supply quantity and/or supply velocity of the reactant supply means 30, etc., and performing the process of a test and activation on the plurality of MEAs.

The controller 46 can be configured to store the characteristic parameter sensed from the plurality of MEAs, and to test the performance such as the voltage-current characteristic, catalyst utility ratio, crossover characteristic, temperature-dependent characteristic, fuel density-dependent characteristic, electrolyte membrane thickness-dependent characteristic, durability, and the like, of the each of the MEA based on the sensed characteristic parameter.

The purging means 50 purges the plurality of MEAs completing the process of testing and activation in the chamber 10, thereby providing the MEA in a state suitable for manufacturing a stack and/or for transport and storage. As the purging means 50, a nitrogen purge, can be used. When the MEA is purged by using the nitrogen purge as the purging means 50, the nitrogen purge can be coupled to the air pump 34$b$ by means of the operation of the valve, etc. operated by the control of the controller 46, and to purge the first channel on the cathode side of the plurality of MEAs and/or the second channel on the anode side thereof by means of the first mass flow controller 36$a$ and/or the second mass flow controller 36$b$.

Figure 3A:
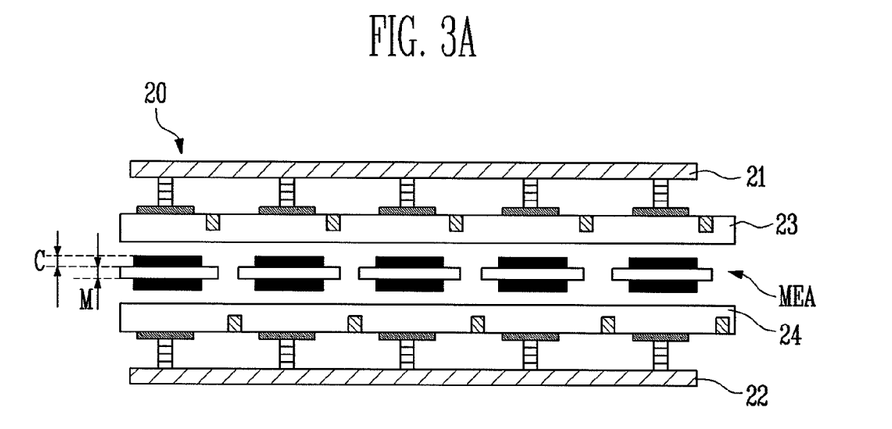
FIGS. 3A and 3B are schematic cross sectional views of an embodiment of an auto pressing means adoptable in the multi-MEA test station.
Figure 3B:
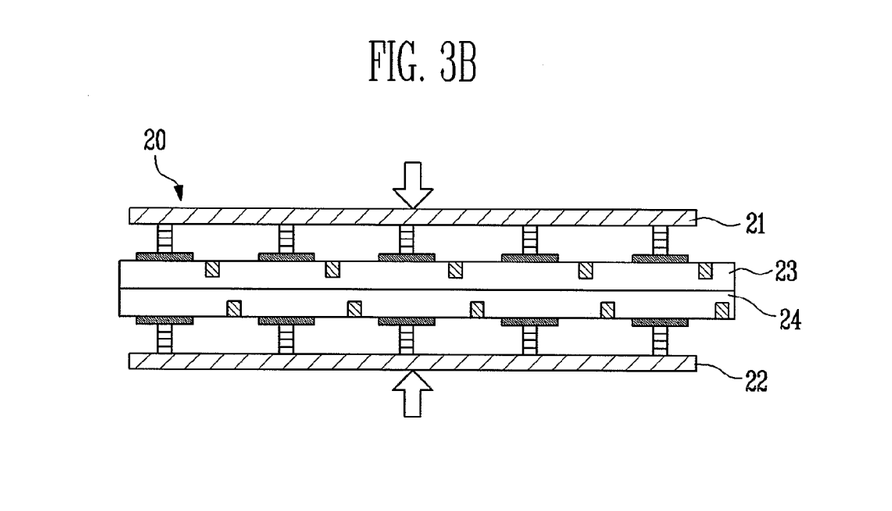

FIGS. 3A and 3B are schematic views of an embodiment of an auto pressing means 20 adoptable in the multi-MEA test station.

As shown in FIG. 3A, the auto pressing means 20 includes pressing means 21 and 22 configured for pressing as MEA received in the chamber, and cell bodies 23 and 24 detachably coupled to the pressing means and arranging a plurality of MEAs.

The multi cell bodies includes a first multi cell 23 body disposed on the cathode electrode of the MEA, and a second multi cell body 24 disposed on the anode electrode thereof. In other words, the multi cell bodies includes an upper first multi body cell 23 and a lower second multi body cell 24, configured for mounting a plurality of MEAs therebetween. The first multi cell body 23 may include an inlet and an outlet for supplying an oxidant to the cathode electrode, and the second multi cell body 24 may include an inlet and an outlet for supplying fuel to the anode electrode.

When a plurality of MEAs are disposed between the first and the second multi cell bodies 23 and 24, the pressing means 21 and 22 compress the plurality of MEAs, sealing the plurality of MEAs between the first multi cell body 23, and the second multi cell 24 body by applying opposing forces therebetween. The pressing means includes a first pressing means 21 contacting the first multi cell body 23, configured to apply pressure thereto, and a second pressing means 22 contacting the second multi cell body 24, configured to apply pressure thereto. As the first pressing means and the second pressing means 21 and 22, a hydraulic pressing device, or the like configured for applying a substantially uniform, predetermined pressure on the plurality of MEAs, can be used.

According to the embodiment described above, as shown in FIG. 3B, the plurality of MEAs can be compressed at a substantially uniform pressure by means of the hydraulic pressing device. In the compressed MEA, the thickness M of the electrolyte membrane, the thickness C of the cathode electrode, and the thickness of the anode electrode may be reduced by the pressure.

Figure 4:
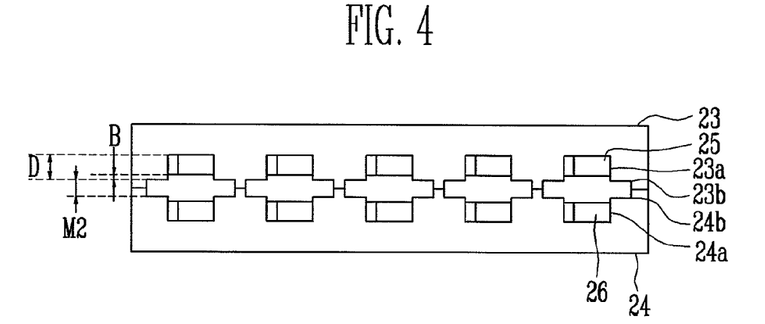
FIG. 4 is a cross-sectional view of an embodiment of a multi cell body adoptable in the multi-MEA test station.

FIG. 4 is a cross-sectional view of an embodiment of a multi cell body 23 adoptable in the multi-MEA test station.

Referring to FIG. 4, the first multi cell body 23 positioned on the lower portion side among a pair of multi cell bodies includes concave portions corresponding to the plurality of MEAs. The concave portion includes a first step part 23a, the height of which is determined according to the thickness of a first bipolar plate 25 and the thickness of a cathode electrode of the MEA, and a second step part 23b, the height of which is determined according to the thickness of the electrolyte membrane of the MEA. The first bipolar plate 25 provided with a first channel for supplying an oxidant to the cathode electrode of the MEA is detachably coupled to a first concave portion formed by the first step part 23a. The depth D of the first concave portion is slightly deeper than the thickness B of the first bipolar plate inserted into the first concave portion, and slightly shallower than the sum of the thickness B of the first bipolar plate 25 and the thickness C of the cathode electrode (Refer to FIG. 3a). And, a second concave portion formed by the second step part 23b receives the electrolyte membrane portion where the cathode electrode of the MEA is not formed, and is slightly shallower than about half of the thickness of the electrolyte membrane.

The second multi cell body 24 also includes a concave portion corresponding to the plurality of MEAs, and approximately opposed to the concave portion of the first multi cell body 23. Similarly to the case of the first multi cell body 23, the concave portion of the second multi cell body 24 includes a first step part 24a, the height of which is determined according to the thickness of a second bipolar plate 26 and the thickness of an anode electrode of the MEA, and a second step part 24b, the height of which is determined according to the thickness of the electrolyte membrane of the MEA. The second bipolar plate 26 is provided with a second channel for supplying fuel to the anode electrode of the MEA, and is detachably coupled to the first concave portion formed by the first step part 24a. The depth of the first concave portion formed by the first step part 24a is slightly deeper than the thickness of the second bipolar plate 26, and slightly shallower than the sum of the thickness of the second bipolar plate 26 and the thickness of the anode electrode of the MEA. And, the second concave portion formed by means of the second step part 24b receives the electrolyte membrane portion where the anode electrode of the MEA is not formed, and is slightly shallower than about half of the thickness of the electrolyte membrane.

According to the embodiment described above, a length M2 determined when the second step parts 23b and 24b of the first and the second multi cell bodies 23 and 24 contact with each other is slightly smaller than the initial thickness M1 of the electrolyte membrane of the MEA. Therefore, when the first multi cell body 23 and the second multi cell body 24 are closely contacted together, the MEA disposed between the first and the second multi cell bodies 23 and 24 is compressed to a predetermined thickness, thereby providing an environment similar to the structure of a stack. In this configuration, the first and the second bipolar plates 25 and 26 contact each side of the MEA to be tested.

Figure 5A:
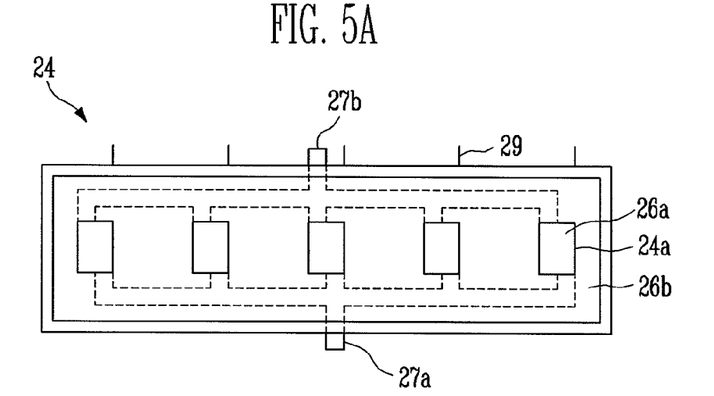
FIGS. 5A and 5B are top views of an embodiment of a multi cell body adoptable in the multi-MEA test station.
Figure 5B:
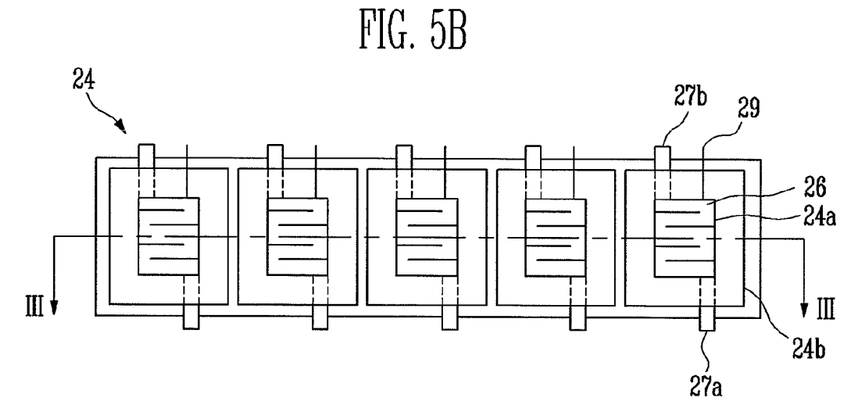

FIGS. 5A and 5B are top views of an embodiment of a multi cell body adoptable in the multi-MEA test station.

In the illustration, a bipolar plate is omitted from FIG. 5A and the bipolar plate is shown in FIG. 5B in order to more easily explain the bipolar plate mounted on the multi cell body. The cross-section taken along the line III-III in FIG. 5B corresponds to the second multi cell body on the lower side among a pair of multi cell bodies in FIG. 4.

Referring to FIGS. 5A and 5B, the multi cell body 24 includes a first concave portion 26a formed by the first step part 24a and receiving a bipolar plate 26 provided with a channel, and a second concave portion 26b formed by the second step part 24b and receiving the electrolyte membrane of the MEA. The multi cell body 24 can comprise a material such as stainless steel, and the like.

Also, the multi cell body 24 includes an inlet 27a coupled to a first end of the channel of the bipolar plate 26 and an outlet 27b coupled to a second end of the channel of the bipolar plate 26, and which are fluidly coupled to the first concave portion 26a of the multi cell body 24 in order to supply fuel to the anode electrode of the MEA.

Also, the multi cell body 24 is electrically coupled to the bipolar plate 26 inserted in the first concave portion 26a through a lead wire 29, a first end of which one end is exposed. The second end of the lead wire 29 is electrically coupled to the anode electrode or the cathode electrode of the MEA. In other words, a plurality of lead wires 29 corresponding to the plurality of MEAs can be installed to electrically couple to the bipolar plate 26 when the bipolar plate 26 is inserted to the first concave portion 26a of the multi cell body 24, and to be electrically separated from the bipolar plate 26 when the bipolar plate 26 is extracted from the first concave portion 26a, with the lead wires 29 electrically insulated from the multi cell body 24.

Meanwhile, the second concave portion 26b formed by the second step part 24b of the multi cell body 24 can comprise a single concave portion so that the side surfaces of the plurality of MEAs contacted with each other, as shown in FIG. 5A, or can comprise a plurality of concave portions arranged with a predetermined spacing, and each receiving of the plurality of MEAs, as shown in FIG. 5B.

The bipolar plate 26 inserted to the first concave part 26a of the multi cell body 24 includes a channel for gas-phase or liquid-phase fluid flow. The channel can be formed in a serpentine shape or in a straight line shape, and the like. The multi cell body 24 can comprise a material such as graphite, and the like.

A method for testing the performance of a plurality of MEAs using the multi-MEA test station according to the present invention will be described.

Figure 6:
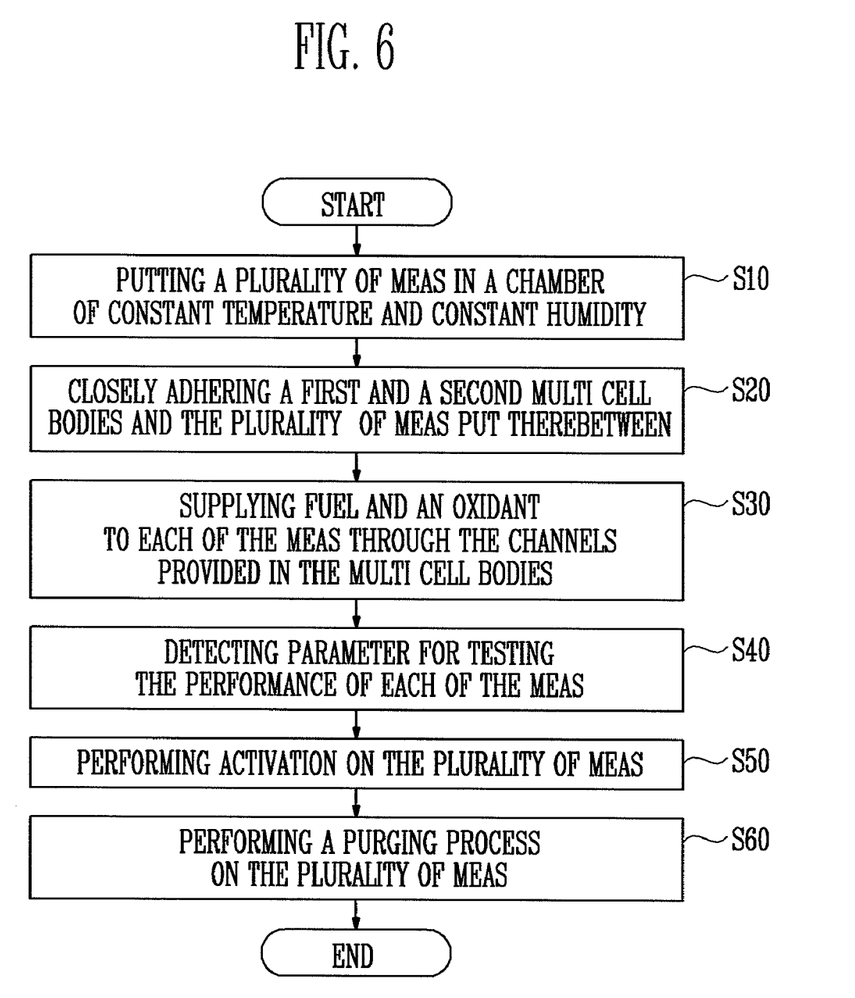
FIG. 6 is a flow chart of an embodiment of a multi-MEA test method.

FIG. 6 is a flow chart of an embodiment of a multi-MEA test method.

Referring to FIG. 6, the multi-MEA test method first prepares a plurality of MEAs and disposes the plurality of the prepared MEAs in a chamber of constant temperature and constant humidity S10. In this step, the plurality of MEAs are disposed in the concave portions of the multi cell body in the chamber in order to easily perform the processes of a test and activation on the plurality of MEAs.

Next, in step S20 a pair of multi cell bodies is pressed using a pressing device in order to closely adhere or contact the pair of the first and the second multi cell bodies with the plurality of MEAs disposed therebetween. This step includes pressing the pair of multi cell bodies with a hydraulic press from opposite directions in order to closely adhere or contact the pair of the multi cell bodies and the plurality of MEAs disposed therebetween at a substantially uniform pressure.

Next, after the environment in the chamber, for example, temperature and humidity, is set to a desired condition, each of the MEAs is supplied with fuel and an oxidant through the first channel and the second channel provided in the pair of multi cell bodies. This step is to operate each of the MEAs, wherein fuel density, fuel flow and oxidant flow supplied to the MEA can be optionally selected for testing the MEA performance.

Next, in step S40, a characteristic parameter of each of the MEA is detected by a multi-loader in order to test the performance of each of the MEAs. The multi-loader can include a plurality of wires coupled to each lead wire of the plurality of MEAs or a plurality of probes. The characteristic parameter of the MEA includes a parameter for testing the performance, such as the voltage-current characteristic, catalyst utility ratio, crossover characteristic, temperature-dependent characteristic, fuel density-dependent characteristic, electrolyte membrane thickness-dependent characteristic, durability, and the like. For example, in some embodiments, the characteristic parameter includes voltage, current, impedance, phase angle, electrostatic capacity, and the like.

Next, each MEA is activated in step S50. This step prepares each MEA completing the performance test of for manufacturing into a stack. This step includes a process of initially operating the MEA under desired conditions for a certain time. The desired conditions include the density of fuel and/or supply flow of an oxidant, the load capacity coupled to the MEA, the load coupling time to the MEA, the temperature and humidity of the chamber, and the like. The conditions for activation can be optionally selected according to the MEA characteristic or the activation manner to be used.

Next, the plurality of MEAs are purged in step S60. This step prepares the MEAs for manufacturing a stack by removing the fuel, oxidant, and reaction products remaining in the plurality of MEAs after activation. The purging process can include nitrogen purging using an inert gas, for example, nitrogen gas. This step provides advantages including ease of preparation, transport, and storage of the MEAs with good quality after testing and activation, and furthermore, provides good quality MEAs for manufacturing a fuel cell stack.

Meanwhile, in the multi-MEA test station in the embodiment, it is preferable that at least two stations thereof are operated together so that the process of the test and activation and/or the purging process on the plurality of MEAs, and the process of loading and unloading on the plurality of MEAs can be alternately performed in order to improve the operation efficiency.

As described above, several tens to several hundreds of MEAs can simultaneously be tested and activated. Therefore, the process for the test and the activation can be simplified and the time of process can be shortened. Also, the performance of each of the plurality of MEAs can be tested, and furthermore, the rate of manufacturing of bad stacks incorporating bad MEAs can be reduced. As a result, it is possible to reduce the occurrence of unnecessary costs of dismantling bad stack, and to contribute to a process automation for a test and activation.

Although a few embodiments have been shown and described, it would be appreciated by those skilled in the art that changes might be made in these embodiments without departing from the principles and spirit of the disclosure, the scope of which is defined in the claims and their equivalents.

What is claimed is:

1. A multi-MEA test station comprising:
   a chamber configured for receiving a plurality of MEAs having a first thickness;
   a first multi cell body that define a plurality of openings having a first and a second step that are sized to accommodate a portion of an MEA having a membrane and a portion of the MEA having a bipolar plate comprising a first channel configured for supplying an oxidant to a cathode electrode of an MEA, and a second multi cell body comprising a second channel configured for supplying fuel to an anode electrode of an MEA;
   a pressing device configured for closely contacting the first multi cell body, the second multi cell body and an MEA interposed therebetween by applying opposed compressive force between the first multi cell body and the second multi cell body to thereby compress the MEA interposed between the first multi cell body and the second multi cell body to a predetermined thickness less than the first thickness;
   a reactant supply configured for supplying an oxidant to the first channel and supplying a fuel to the second channel; and
   a multi-loader configured for controlling the environment of the chamber during testing and activation of the plurality of MEAs, and configured for performing the testing and the activation.

2. The multi-MEA test station as claimed in claim 1, wherein the first multi cell body comprises a plurality of concave portions electrically separated, each concave portion corresponding to an MEA, and the second multi cell body comprises a plurality of concave portions electrically separated, each concave portion corresponding to an MEA, and corresponding to a concave portion of the first multi cell body.

3. The multi-MEA test station as claimed in claim 1, wherein the first multi cell body and the second multi cell body are each detachably mounted on distal portions of the pressing assembly.

4. The multi-MEA test station as claimed in claim 1, wherein the pressing assembly comprises a hydraulic pressing device.

5. The multi-MEA test station as claimed in claim 1, wherein the reactant supply comprises a fuel pump configured for supplying fuel and an air pump configured for supplying oxidant.

6. The multi-MEA test station as claimed in claim 5, wherein the reactant supply comprises a fluid flow controller configured for controlling the flow of fuel supplied from the fuel pump to each of the MEA.

7. The multi-MEA test station as claimed in claim 1, wherein the multi-loader comprises a power source unit configured for applying a DC signal or an AC signal to the MEA, and a sensor for sensing at least one of voltage, current, impedance, and electrostatic capacity of the MEA.

8. The multi-MEA test station as claimed in claim 1, wherein the chamber has a substantially constant temperature and substantially constant humidity.

9. The multi-MEA test station as claimed in claim 8, wherein the chamber comprises a temperature sensor installed adjacent to an MEA.

10. The multi-MEA test station as claimed in claim 1, further comprising a purging device configured for supplying fluid for purging at least one of the first channel and the second channel.

11. The multi-MEA test station as claimed in claim 10, comprising a first station and a second station configured for alternately performing testing and activation of a plurality of MEAs, and configured for loading and unloading the plurality of MEAs.

12. The multi-MEA test station as claimed in claim 1, wherein the fuel comprises a liquid-phase fuel or gas-phase fuel containing hydrogen.

13. The multi-MEA test station as claimed in claim 1, wherein the second multi cell body defines a plurality of openings having a first and a second step that are sized to accommodate a portion of an MEA having a membrane and a portion of the MEA having a bipolar plate.

* * * * *